UNITED STATES PATENT OFFICE.

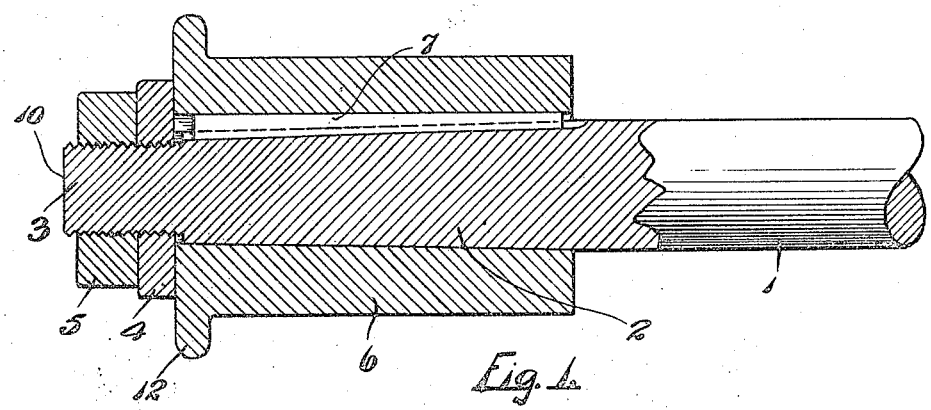
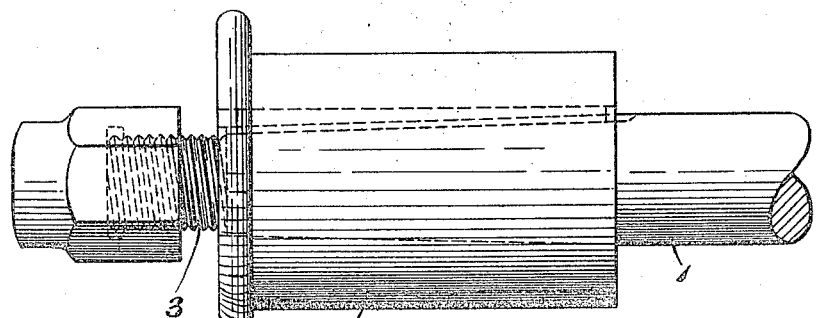
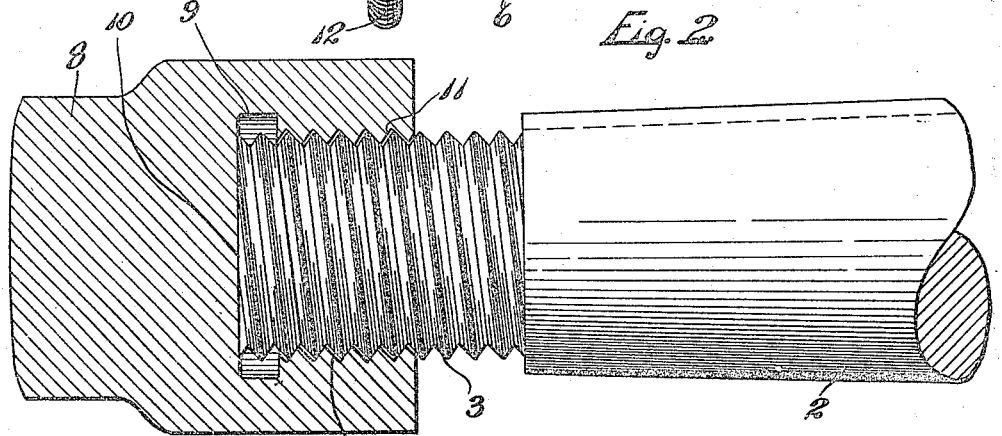

PETER HONN, OF GRAND RAPIDS, MICHIGAN.

WHEEL-REMOVER.

1,146,567.

Specification of Letters Patent.

Patented July 13, 1915.

Application filed January 8, 1915. Serial No. 1,135.

*To all whom it may concern:*

Be it known that I, PETER HONN, a citizen of the United States of America, residing at Grand Rapids, in the county of Kent and State of Michigan, have invented certain new and useful Improvements in Wheel-Removers; and I do hereby declare the following to be a full, clear, and exact description of the invention, such as will enable others skilled in the art to which it appertains to make and use the same.

This invention relates to a method and means for removing wheels of automobiles from axles to which they are permanently attached and especially the rear wheels from the rear axle. And this invention has for one of its objects and purposes the provision of a very simple means to be used in carrying out the said method and one which can be produced very readily and economically.

For an understanding of the invention reference may be had to the accompanying drawing, in which;

Figure 1 is a vertical sectional view through an axle with a hub of a wheel shown secured thereto. Fig. 2 is a side view thereof showing the retaining nuts removed and the wheel remover cap placed on the end of the axle; and Fig. 3 is an enlarged sectional view of the wheel remover cap applied to the screw threaded end of the axle.

Like reference characters refer to like parts throughout the several views of the drawing.

The rear wheels in an automobile are secured directly to the driven axle which is shown at 1 as having a tapered end portion 2 terminating in a screw threaded section 3 adapted to receive nuts 4 and 5 by means of which the hub 6 of the wheel may be secured against lengthwise displacement. The hub is keyed on the tapered end 2 of the axle, by means of the key 7, holding it rigidly in position. When a hub has been forced on the tapered end of the axle and over the key 7 it is ordinarily held very securely against removal. The method of removal which I have invented consists in placing on the end 3 of the axle after nuts 4 and 5 have been removed, a hardened cap 8 which at one end is interiorly bored and threaded for a distance and then counterbored at 9 with a larger diameter and formed with a surface against which the substantially flat end 10 of the screw threaded section 3 of the axle will engage. It will be noted that in interiorly threading this cap 8 the threads are cut so that when the cap is placed on the end 3 a loose fit is made, the cap being screwed on very readily and easily, and when the end 10 abuts against the cap, there will be a slight space as shown at 11 between one side of the thread on the portion 3 and one side of the thread in the cap 8. To remove the wheel, the end of the cap 8 is hammered with considerable force, the impact tending to drive the axle out of the hub. By reason of the looseness of the threads all the force imparted by blows on the shaft 8 will be communicated directly to the end 10 of the screw threaded portion 3 of the axle and no destructive action will take place with respect to the threads, it being evident that if the section 3 of the axle should be upset very slightly from the force of the blows, the spaces 11 close slightly but not sufficient to injure the threads unless the destructive action on the end of the axle becomes very great. It will also be noted that the interior bore of the cap extends inwardly a limited distance only leaving a space between the end 12 of the hub and the end of the cap as shown in Fig. 2 whereby the axle may be driven a distance with respect to the hub 6 without the cap coming in contact with the hub.

I claim:—

1. The method of removing a wheel from an axle to which it is secured consisting in providing a hardened interiorly threaded cap, then screwing such cap on to the threaded end of the axle until the end of the axle abuts against the cap, and then striking the cap to apply force of impact in a direction substantially parallel to the axis of the axle.

2. The method of removing a wheel from an axle to which it is secured consisting in providing a cap interiorly threaded so that it will loosely receive the screw threaded end of the axle, then applying said cap to the axle with the end of the axle abutting against the cap, and then striking the cap with force in a direction substantially parallel to the axis of the axle.

In testimony whereof I affix my signature in presence of two witnesses.

PETER HONN.

Witnesses:
   NIC. SCHMITT,
   H. B. CLARK.